(12) United States Patent
Heiney

(10) Patent No.: US 6,925,256 B1
(45) Date of Patent: Aug. 2, 2005

(54) OPTICAL DISCRIMINATOR FOR TRANSMITTING AND RECEIVING IN BOTH OPTICAL FIBER AND FREE SPACE APPLICATIONS

(75) Inventor: Allan Heiney, Edison, NJ (US)

(73) Assignee: DiPlex, Elkridge, MD (US)

( * ) Notice: Subject to any disclaimer, the term of this patent is extended or adjusted under 35 U.S.C. 154(b) by 0 days.

(21) Appl. No.: 09/506,342

(22) Filed: Feb. 18, 2000

(51) Int. Cl.⁷ .............................................. H04B 10/24
(52) U.S. Cl. ...................... 398/42; 398/41; 398/139; 398/135; 398/164; 398/178; 398/212
(58) Field of Search ................................ 398/164, 139, 398/41–42, 128, 135, 207, 212; 359/589, 359/634

(56) References Cited

U.S. PATENT DOCUMENTS

| | | | |
|---|---|---|---|
| 4,431,258 A | 2/1984 | Fye | 350/1.6 |
| 4,474,424 A | 10/1984 | Wagner | 350/96.16 |
| 4,625,333 A | 11/1986 | Takezawa et al. | 455/612 |
| 4,707,056 A | 11/1987 | Bittner | 350/96.18 |
| 4,767,171 A | 8/1988 | Keil et al. | 310/96 |
| 4,830,454 A | 5/1989 | Karstensen | 359/114 |
| 4,989,934 A | 2/1991 | Zavracky et al. | 350/96.12 |
| 5,066,090 A | 11/1991 | Mayerhofer et al. | 359/634 |
| 5,416,624 A | 5/1995 | Karstensen | 350/96.18 |
| 5,621,573 A | 4/1997 | Lewis et al. | 385/35 |
| 5,663,821 A * | 9/1997 | Suda et al. | 398/139 |
| 6,154,297 A * | 11/2000 | Javitt et al. | 398/128 |
| 6,282,006 B1 * | 8/2001 | Tamada et al. | 398/136 |

* cited by examiner

Primary Examiner—Kinfe-Michael Negash
(74) Attorney, Agent, or Firm—Liniak, Berenato & White

(57) ABSTRACT

A bi-directional communication assembly is provided with commonly available optoelectronic components in a compact package. Diplex functionality is achieved by orienting the receiving detector at an angle with respect to the transmitting beam. An interference coating inside the detector, on the detector surface, or on a surface in intimate contact with the detector, reflects the transmitted beam while simultaneously allowing the receiving beam to pass through the coating to the light absorbing region. The combined function of the receiving detector, providing advantages of a common beam path and close proximity of the components, enable a compact package that can be placed within the space usually occupied by the transmitter light source alone.

10 Claims, 8 Drawing Sheets

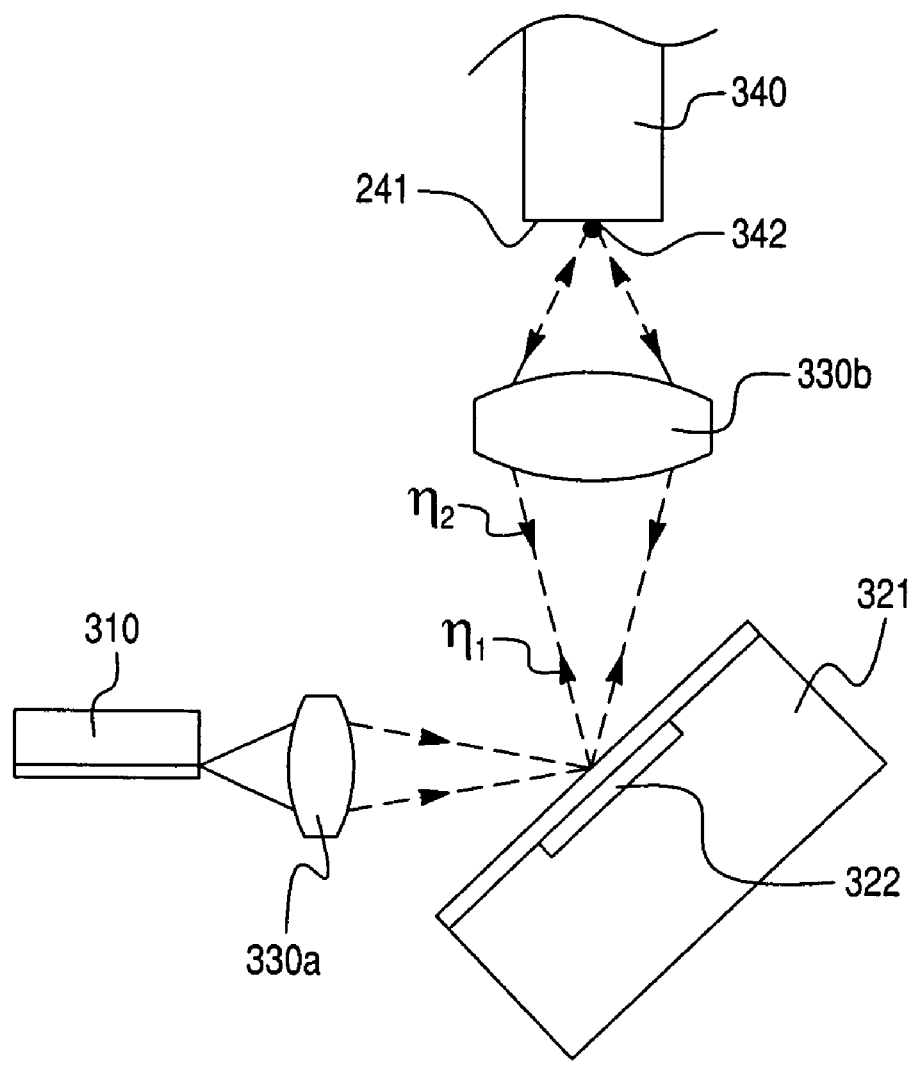

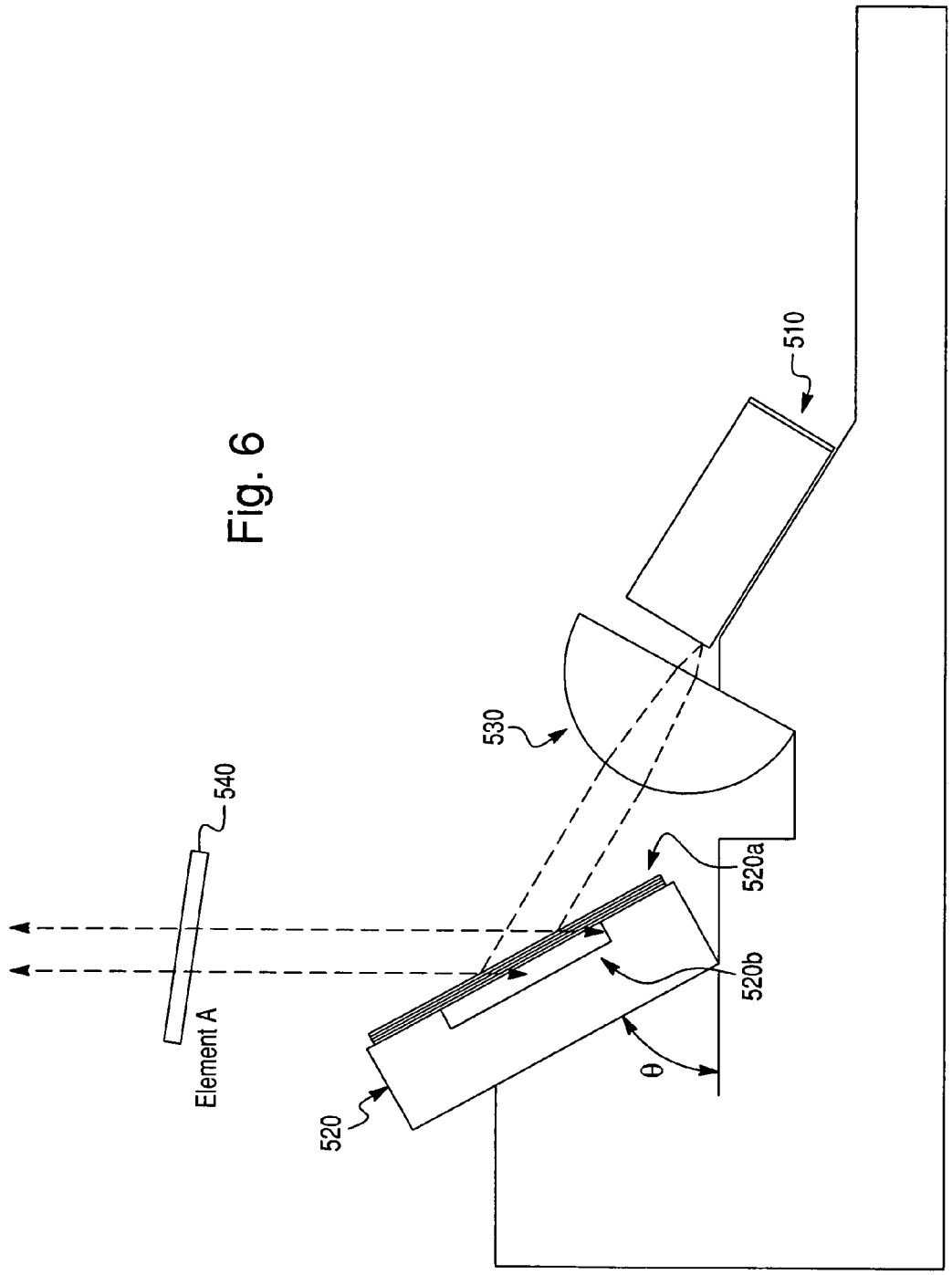

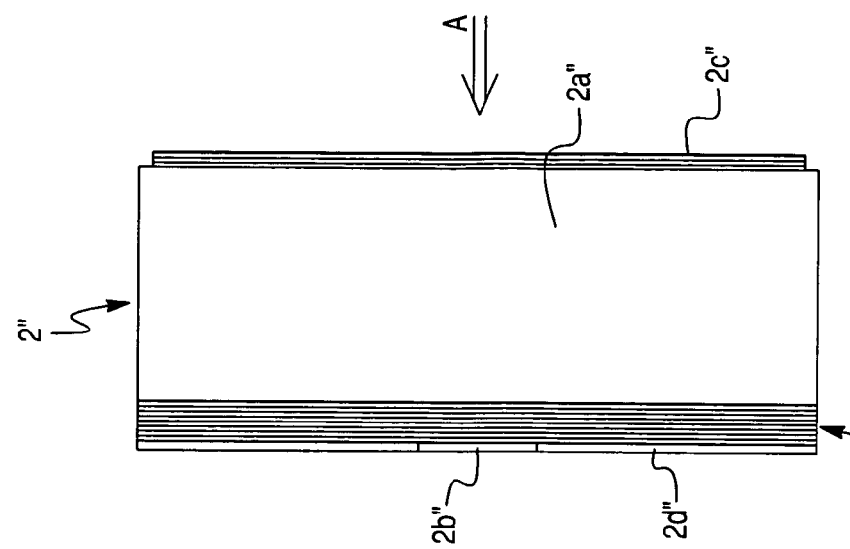
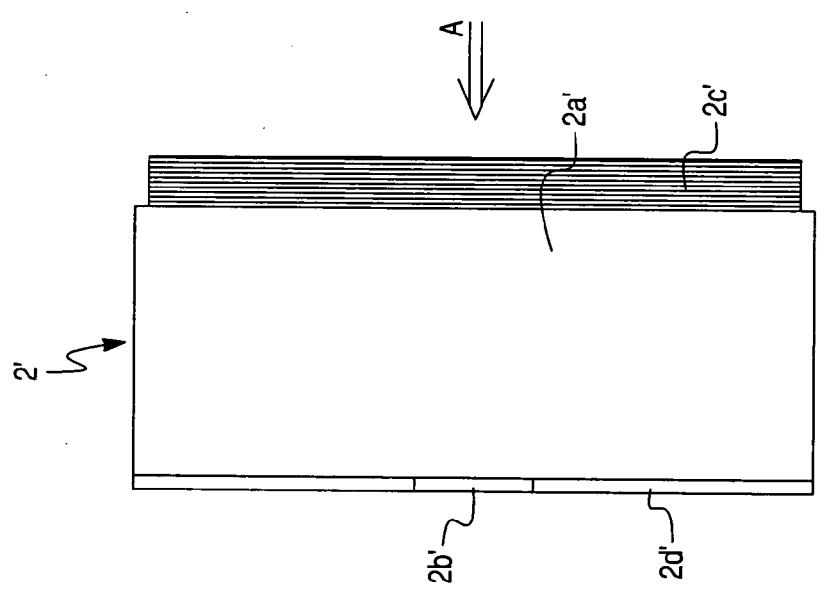
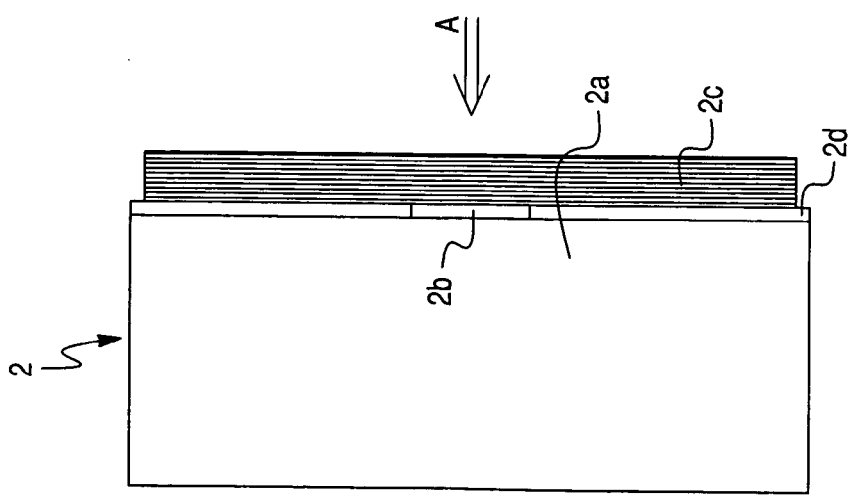
Fig. 7c
Fig. 7b
Fig. 7a

OPTICAL DISCRIMINATOR FOR TRANSMITTING AND RECEIVING IN BOTH OPTICAL FIBER AND FREE SPACE APPLICATIONS

CROSS-REFERENCES TO RELATED APPLICATIONS

There are no applications that are related to the present application.

STATEMENT AS TO RIGHTS TO INVENTIONS MADE UNDER FEDERALLY-SPONSORED RESEARCH AND DEVELOPMENT

There are no rights that require licensing of the present application.

BACKGROUND OF THE INVENTION

1. Field of the Invention

Bi-directional optical communications of arbitrary signals, including but not limited to digital communication streams or short pulses (for example), at the same or differing wavelengths, either coupled to optical fibers or propagated in free space, whereby an interference filter is disposed on or in the photodetector.

2. Description of Related Art

Optical wavelength division multiplexing is a known technique for combining a plurality of optical signals having different wavelengths and inserting the wavelengths into a single optical fiber. The multiple wavelength signal is transmitted through the fiber to a receiving end where the wavelengths are separated and de-multiplexed accordingly. Typically, the wavelengths are multiplexed and de-multiplexed by the use of diffraction gratings or thin film interference filters. These devices provide a spectral selectivity that is predetermined in accordance with the wavelengths in use.

A known bi-directional optical transmission and reception arrangement has an optical transmitter, which is a laser diode, and an optical receiver, which is a photodetector with an absorbing region. Such an optical delivery arrangement comprises two optical lenses. One of the lenses is for optically imaging a laser beam of the first wavelength emitting from the laser diode on a specific spatial point at a distance from the laser coincident with the end of a fiber, and the other lens is for the optical imaging of the second wavelength emitting from the fiber end onto a photodetector. The arrangement includes optical shielding means which is composed of a separate, wavelength-selective optical filter arranged obliquely in the beam path of the radiation of the two wavelengths, and this optical filter is non-transmissive for one of the two wavelengths and is only transmissive for the other of the two wavelengths.

One advantage that results from the use of wavelength division multiplexing is that a single optical fiber can simultaneously carry a plurality of data signals, sometimes in two directions.

The conventional bi-directional transmission and reception systems suffer from numerous drawbacks related to the size and separate packaging of the individual devices, the cost of manufacture, as well as the difficulty associated with alignment of the system.

The need therefore exists for a compact bi-directional transmission/reception system having a compact and economical design and layout.

SUMMARY OF THE INVENTION

The present invention is directed to the object of providing an improved bi-directional optical transmission and reception arrangement which can be constructed more compactly in comparison to present-day arrangements. The arrangement of the present invention is particularly useful for communications networks and/or rangefinding devices.

This object is achieved by an improvement in a bi-directional optical transmission and reception arrangement which is composed of an optical transmitter having an exit pupil for the emission of an optical radiation having a first wavelength, an optical discriminator having an optical detector for the reception of optical radiation having a second wavelength, an optical delivery means for delivering the radiation having the first wavelength emitting from the transmitter to a predetermined spatial point at a distance from the transmitter and from the discriminator and for delivering the radiation having the second wavelength emitting from another co-axial spatial point to the discriminator, comprising a wavelength-selective interference filter that is non-transmissive or reflective for the radiation of the first wavelength and is only transmissive for the radiation of the second wavelength, whereby the optical filter is disposed on or within the optical detector. By virtue of this arrangement, the present invention provides a uniquely compact and efficient system that is more economical and easier to manufacture.

Other advantages and features of the invention will be readily apparent from the following description of the preferred embodiments, the drawings and claims.

BRIEF DESCRIPTION OF THE DRAWINGS

FIGS. 4A and 4b illustrate different embodiments of the invention having specific lens arrangements providing special benefits;

FIG. 6 illustrates the features of the present invention incorporated into a rangefinding device.

FIGS. 7a–7c illustrate arrangements exemplifying various designs of the discriminator of the present invention.

DESCRIPTION OF THE PREFERRED EMBODIMENTS

Figure 1:
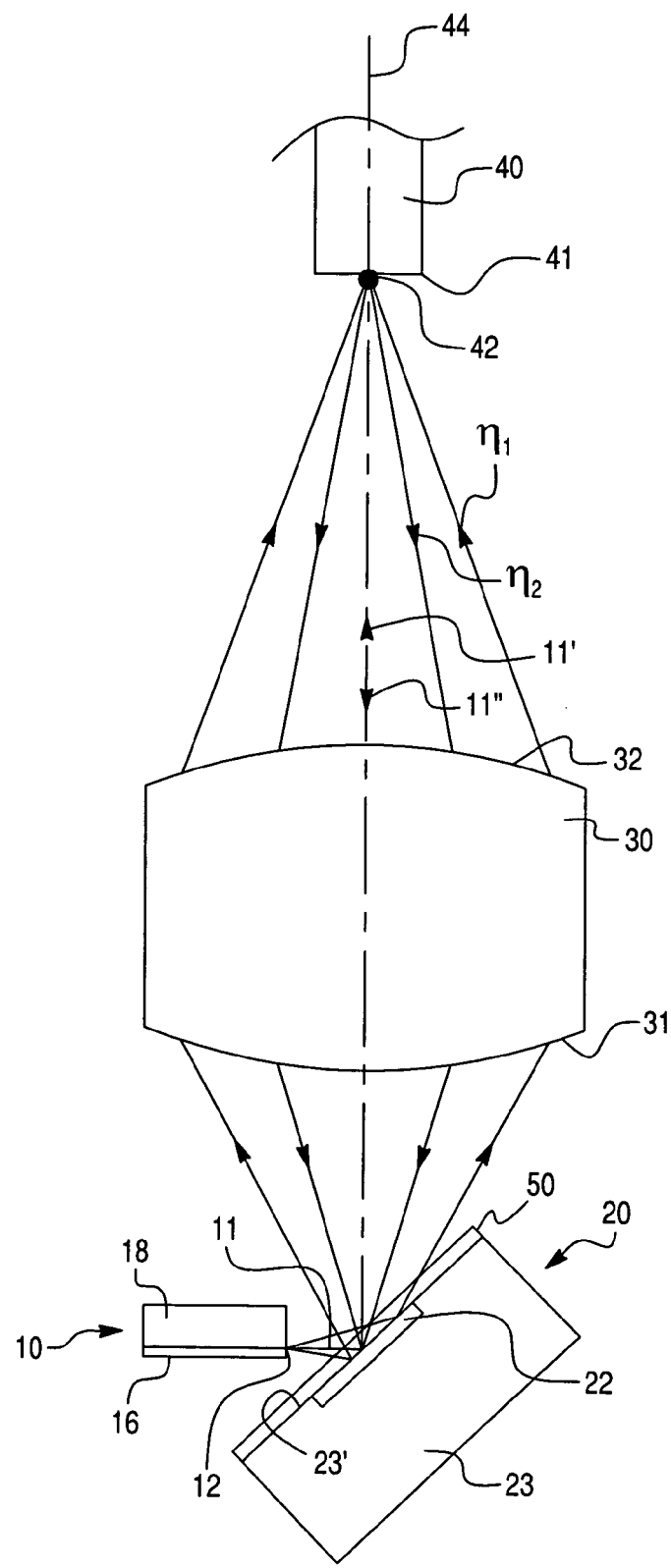
FIG. 1 is a schematic illustration of an exemplary embodiment of the present invention.

The principles of the present invention are particularly useful when incorporated in a bi-directional optical transmission and reception arrangement illustrated in FIG. 1. The arrangement of FIG. 1, as well as the arrangements of FIGS. 2–4, each comprise an optical transmitter (e.g., a laser diode source of the edge or surface emitting type), generally indicated at 10, having a transmission exit pupil 12 for emitting an optical radiation having the first wavelength $\lambda_1$. The optical transmitter 10 is aimed at an optical discriminator (e.g., a PIN photodiode having a dichroic thin film coating), generally indicated at 20, having an absorbing region 22 acting as a receiver window for the reception of an optical radiation of the second wavelength $\lambda_2$, whereby the optical discriminator 20 is preferably disposed at an angle of 45° with respect to the axis of the optical transmitter 10.

As will become apparent from this description, an important feature of the instant invention is the design and arrangement of the discriminator set forth herein. In each embodiment of this invention, the discriminator is formed from a photodetector and an interference filter disposed on or within the photodetector body. FIGS. 7a–7c illustrate various configurations for the discriminator detector sensor and for each illustration the light receiving signal direction is generally shown with an arrow 'A'. In FIG. 7a, the discriminator 2 comprises a base substrate N-contact portion 2a, a light absorbing junction 2b in the p-contact layer(s) 2d of the diode, and a series of vacuum deposited interference filter layers (e.g., dichroic, notch, band-pass, etc.) 2c disposed on the surface of the p-contact layer(s) 2d.

In FIG. 7b, the discriminator 2' comprises a base substrate N-contact portion 2a', a light absorbing junction 2b' in the P-contact layer(s) 2d', and a series of vacuum deposited interference filter layers 2c' disposed on the surface of the base substrate 2a'. The optical cross-talk between transmitter 210 and discriminator 220 can be mitigated by using this so-called rear illumination configuration of the detector portion of the discriminator. In this way, the substrate that comprises the detector allows any leakage of the transmitter signal that passes through the filter to propagate beyond the absorbing region of the detector.

In FIG. 7c, the discriminator 2" comprises a base substrate N-contact portion 2a", a light absorbing junction 2b" in the P-contact layer(s) 2d", a series of vacuum deposited interference filter layers 2c" disposed on the surface of the base substrate 2a", and a series of epitaxially grown interference filter layers 2e disposed within the discriminator as shown. As understood by those of skill in the art, the reflectivity of the coating 2c" of FIG. 7c may be modified to provide an alternate arrangement that functions as a Fabry-Perot PIN detector filter.

In the preferred design of FIG. 1, the optical transmitter 10 is aimed directly at the optical discriminator 20 without any intervening elements such that the detector absorbing region 22 of the discriminator 20 can maintain a relatively small area for maximum speed performance. A lens, generally indicated at 30, is disposed in the optical path of the optical radiation. As previously discussed, an optical filter 50 is arranged on the surface of or disposed within the optical discriminator 20 to provide maximum compactness and optical efficiency.

In addition, a spatial point 42 at a distance from the transmitter exit pupil 12 and the detector absorbing region 22 is allocated in common to these elements and is illustrated as being coincident with the end face 41 of an optical fiber, generally indicated at 40. As understood by those of skill in the art, it is not necessary that the spatial point 42 be coincident with the fiber end face 41. The spatial point 42 is not to be understood as being a mathematical point but is a specific, small spatial region whose dimensions, for example, lie on the order of magnitude of the end face 41 of a core of an optical monomode fiber 40 or an optical multimode fiber.

The transmitter 10 is preferably composed of a laser diode having a strip-like optical waveguide 16 integrated in or on the epitaxially grown layers integrated onto the surface of a substrate 18 and contains optical-compatible material. The waveguide 16 comprises an end face or transmission exit pupil 12 facing toward the optical discriminator 20 from which the laser emission having the first wavelength $\lambda_1$ emerges parallel to the strip-like optical waveguide 16. The transmitter 10 may also be surface emitting such that the first wavelength $\lambda_1$ emerges from the exit pupil perpendicular to the epitaxial layers as grown.

The discriminator 20, for example, comprises a photodiode having an absorbing region 22 sensitive to the radiation having the second wavelength $\lambda_2$. As is known in the art, such absorbing region 22 may be tuned to be sensitive to some wavelengths and not others. This absorbing region 22 is constructed or fashioned either on or under a surface 23' of a substrate 23.

Anyone skilled in the art knows that the lens 30 may be chosen from the group consisting of: spherical lenses, aspherical lenses, gradient lenses and diffractive optical elements, and/or various combinations.

The filter 50, that is disposed on or within the optical discriminator 20, is preferably a multiple layer stack that, for example, can be produced by vapor-deposition of dielectric layers onto the surface 23' of the substrate 23 and the filter characteristics are the same as that of a cut-off filter that is substantially non-transmissive or reflective for the radiation having the first wavelength $\lambda_1$ and is substantially completely transmissive for the radiation having the wavelength $\lambda_2$. Thus, the filter 50 is a high reflector for the radiation having the first wavelength $\lambda_1$ and is, as much as possible, anti-reflecting for the radiation having the second wavelength $\lambda_2$.

It is preferably, but not necessarily, established that in the present embodiment, an axial ray 11 of the laser emission having the first wavelength $\lambda_1$ emitted from the transmitter exit pupil 12 impinges the filter 50 and radiation having the first wavelength $\lambda_1$ is reflected toward lens 30. The radiation beam 11 then passes through the lens 30 and the spatial point 42 near the end face 41 of the fiber 40. The radiation having the second wavelength $\lambda_2$, that is divergently emitted from the end face of the fiber 40, follows a similar optical path as radiation having wavelength $\lambda_1$. The radiation $\lambda_2$ passes through the lens 30, and impinges upon the discriminator 20. Since the filter 50 is designed to provide an anti-reflecting effect for this radiation $\lambda_2$, it passes through the filter 50 and impinges on the absorbing region 22 where it is converted into an electrical signal.

In a specific example of FIG. 1, the thin film coating filter 50 disposed on the detector 20 is greater than 99% reflective at 1310 nm and approximately 85% transmissive at 1550 nm (or vice versa for the opposite end of the link), and is largely polarization independent at 45 degrees. Of course, this example provides only one of many possible examples.

The fiber 40 can be a standard monomode fiber having a diameter of 125 μm and a core size of 9 μm. As understood by those of skill in the art, one way to suppress fiber end face reflections back to the transmitter is that the end face 41 of the fiber 40 facing toward the lens 30 may be somewhat inclined relative to an axis 44 of the fiber 40. This inclination is such that a surface normal of the end face forms an angle with the axis of the fiber 40. To improve transmission into the fiber 40, the axis 44 of the fiber may then be tilted with respect to the axis of the input beam 11.

Figure 2:
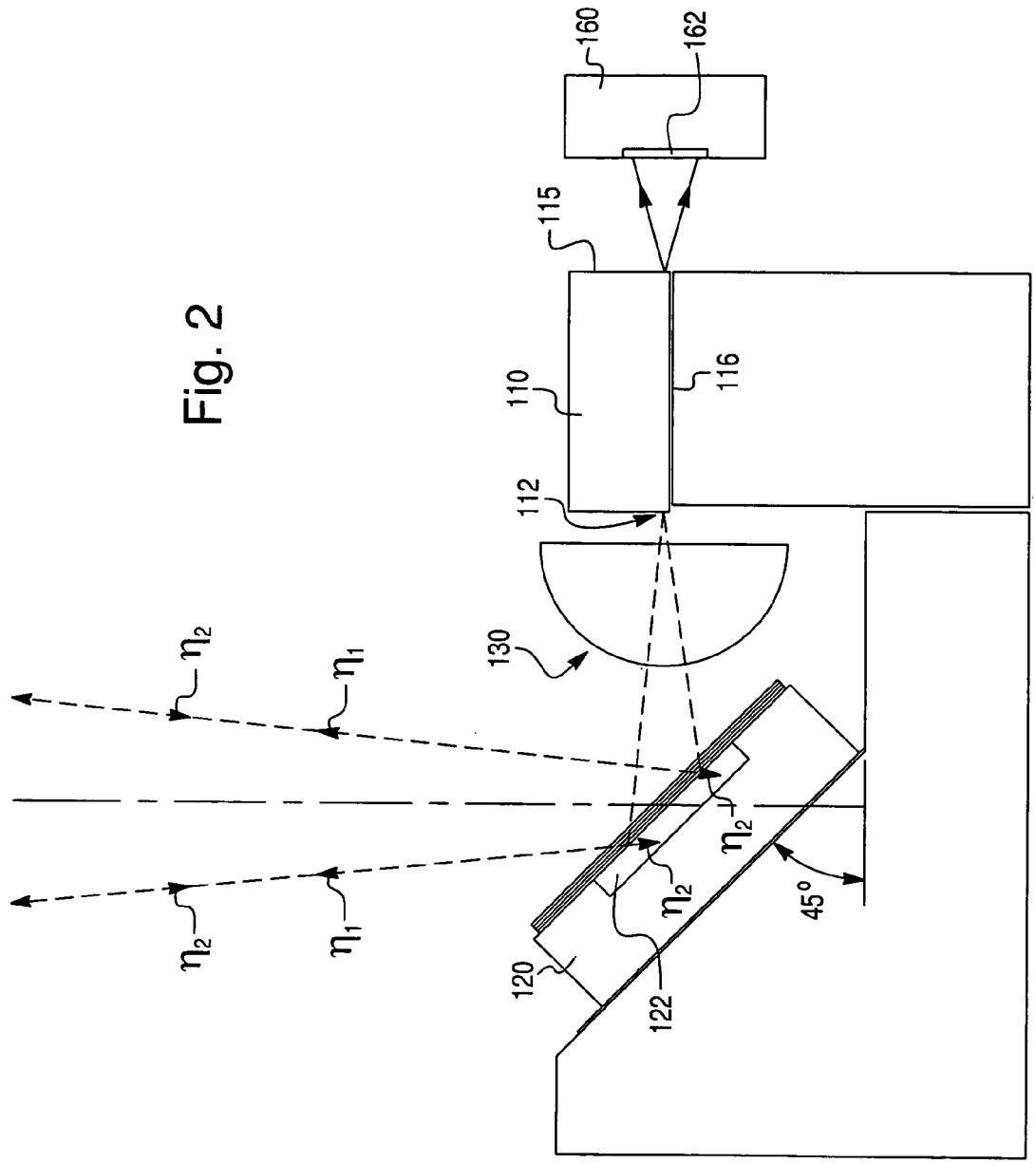
FIG. 2 is a schematic illustration of a second embodiment of the present invention.

A second embodiment of the invention is shown in a simplified form in FIG. 2 which differs from the arrangement of FIG. 1 in that the lens 130 is disposed between the optical transmitter 110 and the optical discriminator 120. As in the embodiment of FIG. 1, the transmitter 110 (e.g., a laser diode source of the edge or surface emitting type), has a transmission exit pupil 112 for emitting an optical radiation having the first wavelength $\lambda_1$. The emitted radiation is aimed at an optical discriminator (e.g., a dichroic coated PIN photodiode) 120 having an absorbing region 122 for the reception of an optical radiation of the second wavelength $\lambda_2$, whereby the optical discriminator 120 is preferably disposed at an angle of 45° with respect to the axis of the optical radiation having the first wavelength $\lambda_1$. Unlike the design of FIG. 1, lens 130 is disposed between the optical transmitter 110 and the optical discriminator 120 and therefore the absorbing region 122 can maintain a relatively small area for higher speed performance. As with the embodiment of FIG. 1, an optical filter 150 is disposed on the surface of or within the optical discriminator 120 to provide maximum compactness and optical efficiency.

FIG. 2 also shows a monitor diode 160 which may, likewise, be present in the arrangement of FIG. 1, but which was omitted in FIG. 1 for the sake of simplicity. The monitor diode 160 will serve the purpose of monitoring the output of laser diode 110. The monitor diode comprises an absorbing region 162 that receives radiation having the first wavelength $\lambda_1$ from the laser diode 110. This radiation emerges from an end face 115 of the strip-shaped waveguide 116 of the laser diode 110 that faces away from the transmitter exit pupil 112. For transmitter systems lacking a rear end face transmission signal or incorporating an integrated monitor, such a separate monitor diode 160 may not be required.

For a transmitter which does not have an alternate beam that can be used for monitoring purposes, the discriminator can in some cases be used by an external circuit to monitor the output of the transmitter.

It can be very advantageous for construction-related reasons to package the transmitter 10, 110; discriminator 20, 120 and optionally the lens 30, 130 as a subassembly. This is true both for the arrangement of FIG. 1 as well as for the embodiment of FIG. 2.

Figure 3:
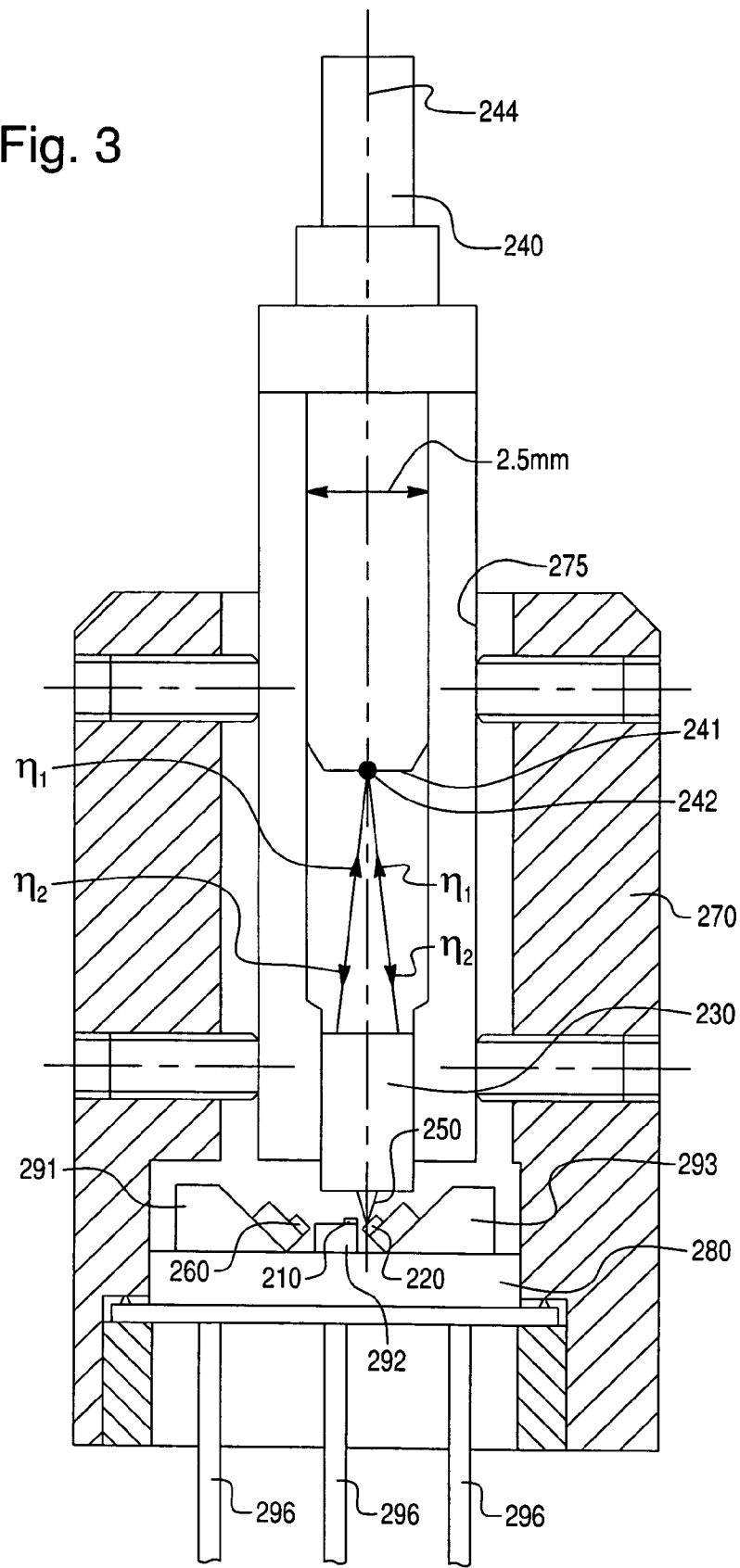
FIG. 3 is a cross sectional illustration of a bi-directional module having a third embodiment of the present invention.

In FIG. 3, a true-to-scale arrangement or embodiment is shown in cross sectional view with reference to the axis 244 of the fiber 240 and the lens 230. These components are separately secured relative to the housing 270, the transmitter 210 and discriminator 220. The end face 231 of the lens 230 faces toward the optical discriminator 220 provided with a filter 250 as described above with respect to FIGS. 1 and 2. The discriminator 220 is also arranged relative to the optical transmitter 210. A radiation signal $\lambda_1$ is transmitted from the optical transmitter onto the surface of the filter 250 whereby radiation signal $\lambda_1$ is reflected by the filter 250 toward the lens 230. The radiation signal $\lambda_1$ is then transmitted through the lens 230 and focussed by the lens 230 onto the spatial point 242 nearly coincident with the end of the fiber 240. The bi-directional light path comprises not only radiation signal $\lambda_1$ but also return radiation signal $\lambda_2$. The radiation signal $\lambda_2$ is transmitted from the optical fiber 240 toward the lens 230. The lens 230 then focuses the radiation signal $\lambda_2$ onto the absorbing region of the discriminator 220.

FIG. 3 also shows a monitor diode 260 which monitors the laser diode 210. The monitor diode 260 comprises an absorbing region that receives radiation having the first wavelength $\lambda_1$ from the laser diode 210. This radiation emerges from an end face of the strip-shaped waveguide of the laser diode 210 that faces away from the transmitter exit pupil.

The transmitter 210, discriminator 220, and diode 260 are supported by pedestals 291, 292 and 293 respectively, which are arranged at a distance from one another. The pedestals are supported on a housing floor 280 of the housing. The transmitter 210, discriminator 220, and lens 230 form the primary components of a sub-unit in the present construction.

The lens 230, the transmitter 210 and the discriminator 220 are covered by a cap-shaped housing cover 270 which can be either permanently or detachably connected to the housing floor 280. The cover 270 is preferably composed of metal and has a window opening 275 for an undisturbed passage of the radiation having the first wavelength $\lambda_1$ into and the radiation having the second wavelength $\lambda_2$ out of the optical fiber 240.

The fiber 240 and lens 230 are held in a flange that lies within the housing 270 and holds the end face 241 of the fiber 240 in the region of the window opening 275 of the housing cover 270. Thus, the radiation of the first wavelength $\lambda_1$ transmitted through the lens 230 will be focussed at the spatial point 242, and the radiation of the second wavelength $\lambda_2$ emitted from the end face 241 will be imaged near the light absorbing region 222 of the discriminator 220 by the lens 230. Pin-shaped, electrical terminals are referenced 296, and these project through the housing floor 280 into the inside of the housing and serve the purpose of electrical contacting of the electrical circuits and components inside of the housing. The monitoring diode 260 having the absorbing region 262 is also included among these and is held by contact strips connected to two of the terminals 296; of which, three are shown. Of course, many more may be used.

Figure 4B:
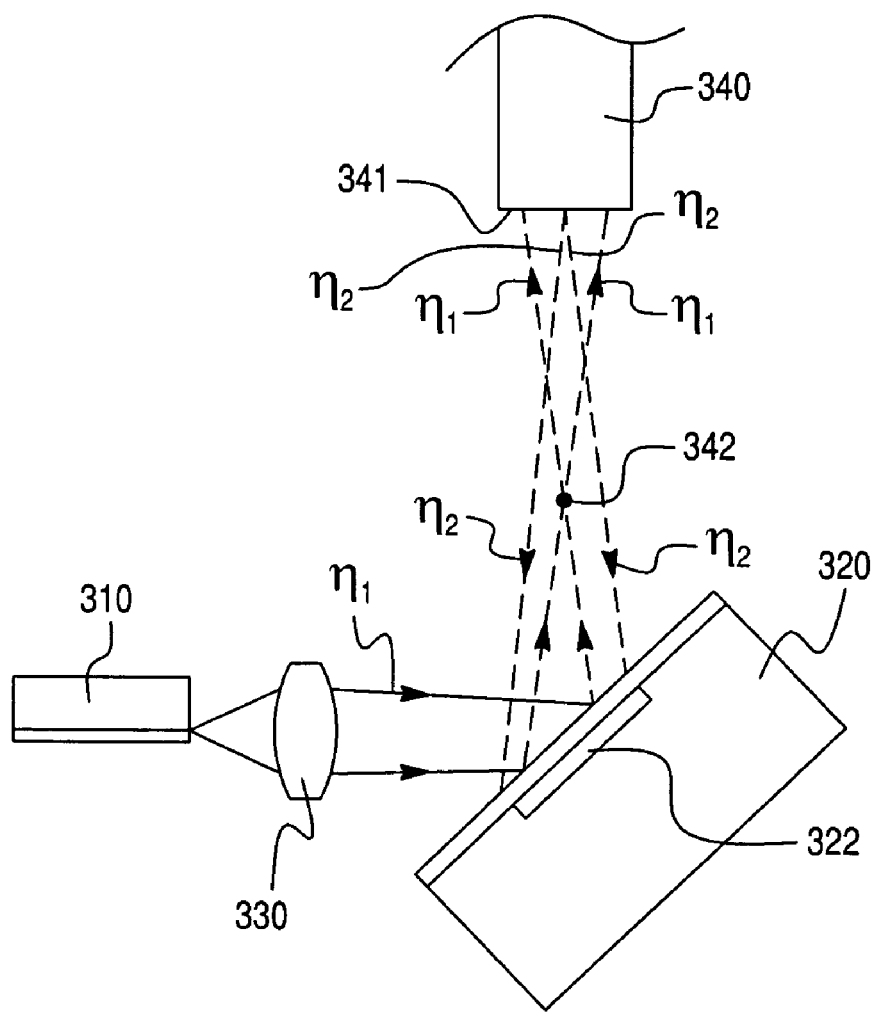

FIGS. 4A and 4B illustrate alternate embodiments wherein the arrangement and disposition of various lens elements provide unique benefits and advantages. FIG. 4A shows an arrangement whereby a transmitter 310 transmits a first radiation signal $\lambda_1$ in a manner similar to the previous embodiments. The first radiation signal then passes through a first optical lens element 330a that focuses the first radiation signal $\lambda_1$ onto the discriminator 320. Radiation signal $\lambda_1$ is reflected by the filter 350 disposed on or within the discriminator 320, and the first radiation signal $\lambda_1$ is then transmitted through a second optical lens element 330b which focuses the radiation signal $\lambda_1$ to the spatial point 342 on or near the end face 341 of the fiber 340. As with the previous embodiments, the second radiation signal $\lambda_2$ passes from the end face 341 through the second optical lens element 330b. The second optical lens element 330b focuses the second radiation signal $\lambda_2$ through the interference filter 350 onto the absorbing region 322 of the discriminator 320. As with the previous embodiments, the filter 350 is designed to reflect the wavelength $\lambda_1$ and to transmit the wavelength $\lambda_2$.

For the embodiment of FIG. 4A, the first and second radiation signals $\lambda_1$ and $\lambda_2$ follow equal paths but in opposite directions. Because the laser signal is focussed onto the discriminator 320, the best coupling of the signal $\lambda_1$ onto the end face 341 of the fiber 340 coincides with the best coupling of the signal $\lambda_2$ coming from the fiber onto the absorbing region 322. One benefit of this common-focus arrangement is that the absorbing region 322 can be kept as small as possible for maximum high speed operation.

In the embodiment of FIG. 4B, the second optical lens element is removed. For this embodiment, the end face 341 of the fiber 340 may or may not coincide with the focus 342 of the transmitter depending on the fiber coupling requirements. As illustrated by FIG. 4B, the first radiation signal $\lambda_1$ has a focus point 342 somewhere between the discriminator 320 and the end face 341 of the fiber 340. The advantage of this embodiment is that the fiber may be placed very close to the discriminator and only a single lens is required to keep the absorbing region 322 as small as possible for high speed performance.

Figure 5:
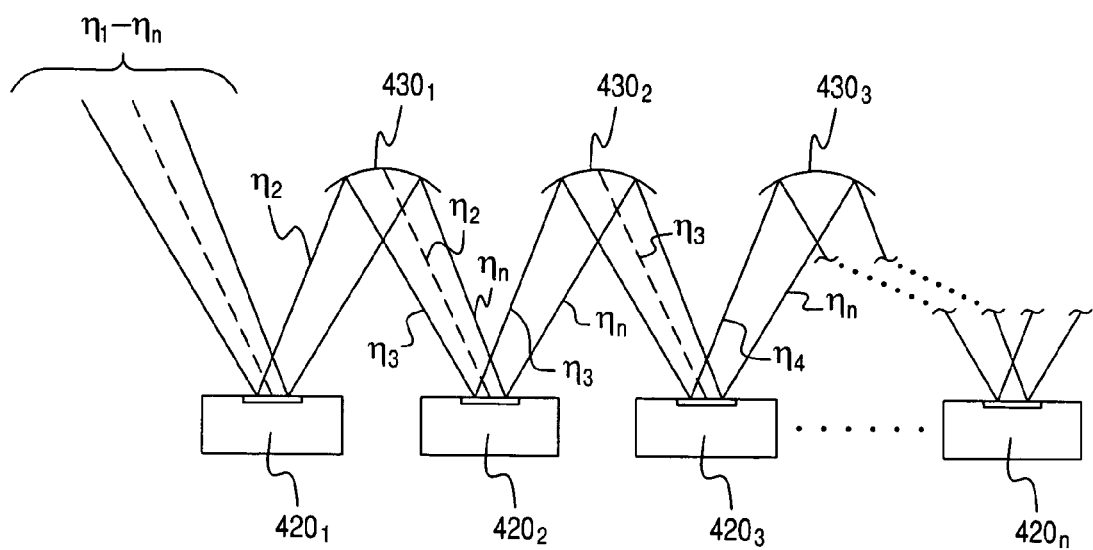
FIG. 5 is a schematic illustration of a cascading array of optical discriminators in accordance with the present invention.

A cascaded discriminator arrangement of this invention is schematically illustrated in FIG. 5. As shown, the radiation signal having wavelengths $(\lambda_1 - \lambda_n)$ is transmitted to a series of discriminators $(420_1 - 420_n)$ whereby an interference filter is disposed on or within each optical detector comprising the discriminator. As with the previous embodiments, the interference filters selectively reflect and transmit predetermined wavelengths. For the cascaded discriminator arrangement, a first signal ($\lambda_1$) passes through the filter of the first discriminator $420_1$ whereby the signal is converted to an electrical signal by the absorbing region, while the remaining signals ($\lambda_2$–$\lambda_n$) are reflected. The reflected signals ($\lambda_2$–$\lambda_n$) propagate to a mirror $430_1$ and these remaining signals are then directed to a second discriminator $420_2$. Here, a second signal ($\lambda_2$) passes through the filter of the second discriminator $420_2$, while the remaining signals ($\lambda_3$–$\lambda_n$) are reflected by the second discriminator $420_2$. The reflected signals ($\lambda_3$–$\lambda_n$) then propagate to a second mirror $430_2$ and these remaining signals are then directed to a third discriminator $420_3$. Likewise, a third signal ($\lambda_3$) passes through the filter of the third discriminator $420_3$, while the remaining signals ($\lambda_4$–$\lambda_n$) are reflected by the third discriminator $420_3$. The reflected signals ($\lambda_4$–$\lambda_n$) then propagate to a third mirror $430_4$ and these remaining signals are then directed to any number of downstream discriminators $420_n$ as deemed appropriate.

For the preceding cascaded arrangement, it is understood that one or more mirrors may be replaced by lenses or other spatial phase converting optical elements and/or discriminator(s) of the type described above.

Similarly, the photodiodes can be advantageously fashioned or constructed as linear shaped photodiode arrays that are simple to manufacture on a surface of a substrate shared in common by all the photodiodes.

FIG. 6 illustrates a cross sectional view of a rangefinder or free space communications device incorporating the features of the present invention. As shown in FIG. 6, a signal transmitter 510 transmits an electromagnetic signal through a collimating lens 530 onto a discriminator member 520. As with the previous embodiments, the discriminator 520 comprises a photodetector and an interference filter 520a disposed on or within the photodetector 520b. For these applications, the interference filter 520a can be designed to be polarization (and possibly also wavelength) discriminating, and the discriminator 520 should be disposed at an angle θ which in this example is set at 60°. The electromagnetic signal reflected by the discriminator 520 is preferably s-polarized. The electromagnetic signal then passes through a quarter (¼) wave plate 540 disposed at a proper angle, and is converted to generally elliptical or circular polarization. Upon reflection from the object being detected or as a result of a signal generated by another transmitter, the electromagnetic signal re-traverses the quarter (¼) wave plate 540 and is converted to p-polarization at which time it is transmitted through the filter 520a to the absorbing region 520b. The absorbed radiation is then converted into an appropriate electrical signal to be processed according to known techniques.

The monomode fibers 40, 140, 240 employed in the exemplary embodiments can also be multimode fibers. A variety of lenses may be employed in this invention, including but not limited to one or more far-field reducing lenses, cylindrical lenses, aspherical lenses, spherical lenses, gradient index lenses, and diffractive elements. The specific dimensions and characteristic of such lenses will depend on the specific application as will be understood by those of skill in the art.

Apart from the monitor detector, an arrangement of the invention advantageously requires only two opto-electronic components which are the optical transmitter and an optical discriminator whose face is reflective for one of the two wavelengths and is transmissive for the other. A separate filter and detector housing, and the additional lenses required for the detector, together with the assembly and adjustment costs thereof, are eliminated. This structure can be so compactly designed that the entire module, except for the lenses and when necessary the fibers can be accommodated in a housing normally required for the transmitter alone. Moreover, the invention is advantageously capable of being arranged in an array so that multi-channel, bi-directional modules for fiber arrays can also be realized.

Although various minor modifications may be suggested by those versed in the art, it should be understood that I wish to embody within the scope of the patent granted hereon all such modifications as reasonably and properly come within the scope of my contribution to the art.

What is claimed is:

1. A directional discriminator system for electromagnetic radiation including at least one first wavelength and at least one second wavelength, the directional discriminator comprising:

a detector having an interference coating adapted for reflecting the at least one first wavelength and adapted for transmitting the at least one second wavelength, said detector having an absorbing region adapted for converting to electrical energy the at least one second wavelength transmitted through said interference coating; and a source adapted for emitting the first wavelength at an oblique angle with respect to said interference coating; wherein said source is adapted for emitting the first wavelength so as to be incident on said interference coating and to be reflected by said interference coating.

2. The directional discriminator system according to claim 1, wherein said interference coating is of the type described as dichroic, bandpass, edge, notch, or comb, whereby said interference coating is adapted to at least partially reflect the at least one first wavelength and adapted to at least partially transmit the at least one second wavelength.

3. The directional discriminator system according to claim 2, wherein said interference coating is adapted for reflecting at least 90% of the first wavelength and adapted for transmitting at least 60% of second the wavelength.

4. The directional discriminator system according to claim 2, wherein said interference coating is substantially polarization independent at said oblique angle.

5. The directional discriminator system according to claim 1, wherein said oblique angle is 45 degrees.

6. The directional discriminator system according to claim 1, wherein said source is a laser.

7. The directional discriminator system according to claim 1, wherein said detector is a PIN diode photodetector.

8. The directional discriminator system according to claim 1, further comprising a lens interposed between said source and said discriminator, said lens adapted to focus the at least one first wavelength onto said interference coating.

9. The directional discriminator system according to claim 1, further comprising a lens adapted to focus the at least one second wavelength onto said interference coating.

10. The directional discriminator system according to claim 1, further comprising at least one modifying element adapted to be disposed in a beam of electromagnetic radiation, said modifying element being selected from the group consisting of at least one of a birefringent wave plate, a Faraday rotator, and a polarizing element.

* * * * *